(12) United States Patent
Pitts et al.

(10) Patent No.: US 9,414,716 B2
(45) Date of Patent: Aug. 16, 2016

(54) ADJUSTABLE RACK SYSTEM

(71) Applicants: Ian Jordan Pitts, Portland, OR (US); James Bartholomew Salatka, Encinitas, CA (US)

(72) Inventors: Ian Jordan Pitts, Portland, OR (US); James Bartholomew Salatka, Encinitas, CA (US)

( * ) Notice: Subject to any disclaimer, the term of this patent is extended or adjusted under 35 U.S.C. 154(b) by 0 days.

(21) Appl. No.: 14/861,994

(22) Filed: Sep. 22, 2015

(65) Prior Publication Data

US 2016/0015221 A1    Jan. 21, 2016

Related U.S. Application Data

(63) Continuation of application No. 14/335,770, filed on Jul. 18, 2014, now Pat. No. 9,198,528.

(51) Int. Cl.
| | |
|---|---|
| *A47J 47/16* | (2006.01) |
| *A47F 3/00* | (2006.01) |
| *A47B 45/00* | (2006.01) |
| *A47B 47/00* | (2006.01) |
| *A47F 5/10* | (2006.01) |
| *A47F 7/00* | (2006.01) |
| *A47G 19/08* | (2006.01) |

(52) U.S. Cl.
CPC .............. *A47J 47/16* (2013.01); *A47B 45/00* (2013.01); *A47B 47/0091* (2013.01); *A47F 3/004* (2013.01); *A47F 5/10* (2013.01); *A47F 7/0064* (2013.01); *A47G 19/08* (2013.01)

(58) Field of Classification Search
CPC ...... A47J 4747/16; A47J 45/10; A47B 45/00; A47B 47/0091; A45F 3/004; A47F 7/285; A47F 5/10; A47F 7/0064; F16M 11/20; Y10T 403/3921; A47G 19/08
USPC ........................................................ 211/204
See application file for complete search history.

(56) References Cited

U.S. PATENT DOCUMENTS

| | | | | |
|---|---|---|---|---|
| 4,343,578 | A * | 8/1982 | Barnes ...................... | B60P 7/15 410/143 |
| 5,997,228 | A * | 12/1999 | Potter ....................... | B60P 7/15 410/117 |
| 6,752,575 | B1 * | 6/2004 | Moore .................. | B60P 7/0892 410/121 |
| 6,830,418 | B2 * | 12/2004 | Keramidis ........... | B61D 45/006 410/143 |
| 2011/0186533 | A1 * | 8/2011 | Thrush ...................... | A47F 5/08 211/113 |

\* cited by examiner

*Primary Examiner* — Korie H Chan
(74) *Attorney, Agent, or Firm* — Weiss & Moy, P.C.; Jeffrey D. Moy

(57) ABSTRACT

An adjustable rack system that is adjustable in length as well as in width. The adjustable rack system may be used to vertically stack and display or store pies or other food or non-food items. The adjustable rack system comprises at least to support members that may be positioned parallel to each other. Each support member comprise a pair of top sliding rails, a pair of bottom sliding rails, and a pair of vertical supports, each vertical support used to couple one of the top sliding rails to a corresponding bottom rail.

9 Claims, 3 Drawing Sheets

ADJUSTABLE RACK SYSTEM

RELATED APPLICATIONS

The present application is a Continuation of U.S. Patent Application entitled, "ADJUSTABLE RACK SYSTEM", having Ser. No. 14/335,770, and a filing date of Jul. 18, 2014, in the name of the same inventors.

FIELD OF THE INVENTION

This disclosure generally relates to rack systems, and more particularly, to an adjustable rack system for vertically stacking multiple items.

BACKGROUND OF THE INVENTION

In the food service industry, it may be desirable to display several pies or other food items (and non-food items) on a counter or store them in a refrigerator/freezer. However, counter space and storage space within a refrigerator or freezer are often limited. Pie stands and racks are available for use, but those stands and racks are too large and bulky to offer any space-saving benefits. Furthermore, those pie stands and racks usually are not adjustable and can only accommodate a predetermined size of pies or other food dishes.

SUMMARY OF THE INVENTION

This summary is provided to introduce a selection of concepts in a simplified form that are further described below in the DESCRIPTION OF THE APPLICATION. This summary is not intended to identify key features of the claimed subject matter, nor is it intended to be used as an aid in determining the scope of the claimed subject matter.

In accordance with one embodiment of the present invention, an adjustable rack system is disclosed. The adjustable rack system comprises: at least two support members, wherein each support member comprises: a pair of opposing top sliding rails; a pair of opposing bottom sliding rails; and a pair of vertical supports, each vertical support coupling a top sliding rail to a corresponding bottom sliding rail, wherein the vertical supports are coupled at opposing ends of the support member.

In accordance with one embodiment of the present invention, an adjustable rack system is disclosed. The adjustable rack system comprises: a first top sliding rail having two grooves oriented in an opposite direction from one another, each groove formed along a portion of a length of the first top sliding rail and having a half-dovetail shape; a second top sliding rail having two grooves oriented in an opposite direction from one another, each groove formed along a portion of a length of the second top sliding rail and having a half-dovetail shape; a first bottom sliding rail having two grooves oriented in an opposite direction from one another, each groove formed along a portion of a length of the first bottom sliding rail and having a half-dovetail shape; a second bottom sliding rail having two grooves oriented in an opposite direction from one another, each groove formed along a portion of a length of the second bottom sliding rail and having a half-dovetail shape; a first vertical support coupling the first top sliding rail to the first bottom sliding rail; and a second vertical support coupling the second top sliding rail to the second bottom sliding rail, wherein the two grooves of the first top sliding rail mate with and slidably engage the two grooves of the second top sliding rail; and wherein the two grooves of the first bottom sliding rail mate with and slidably engage the two grooves of the second bottom sliding rail.

In accordance with one embodiment of the present invention, an adjustable rack system is disclosed. The adjustable rack system comprises: a first top sliding rail having: an upwardly facing half-dovetail groove that extends along a first half of the length of the first top sliding rail; and a downwardly facing half-dovetail groove that extends along a remaining half of the length of the first top sliding rail; a second top sliding rail having: a downwardly facing half-dovetail groove that extends along a first half of the length of the second top sliding rail; and an upwardly facing half-dovetail groove that extends along a remaining half of the length of the second top sliding rail; a first bottom sliding rail having: a downwardly facing half-dovetail groove that extends along a first half of the length of the first bottom sliding rail; and an upwardly facing half-dovetail groove that extends along a remaining half of the length of the first bottom sliding rail; a second bottom sliding rail having: an upwardly facing half-dovetail groove that extends along a first half of the length of the second bottom sliding rail; and a downwardly facing half-dovetail groove that extends along a remaining half of the length of the second bottom sliding rail; a first vertical support coupling the first top sliding rail to the first bottom sliding rail; and a second vertical support coupling the second top sliding rail to the second bottom sliding rail, wherein the upwardly facing half-dovetail groove of the first top sliding rail mates with and slidably engages the downwardly facing half-dovetail groove of the second top sliding rail, wherein the downwardly facing half-dovetail groove of the first top sliding rail mates with and slidably engages the upwardly facing half-dovetail groove of the second top sliding rail, wherein the downwardly facing half-dovetail groove of the first bottom sliding rail mates with and slidably engages the upwardly facing half-dovetail groove of the second bottom sliding rail, and wherein the upwardly facing half-dovetail groove of the first bottom sliding rail mates with and slidably engages the downwardly facing half-dovetail groove of the second bottom sliding rail.

DETAILED DESCRIPTION OF THE PREFERRED EMBODIMENTS

Figure 1:
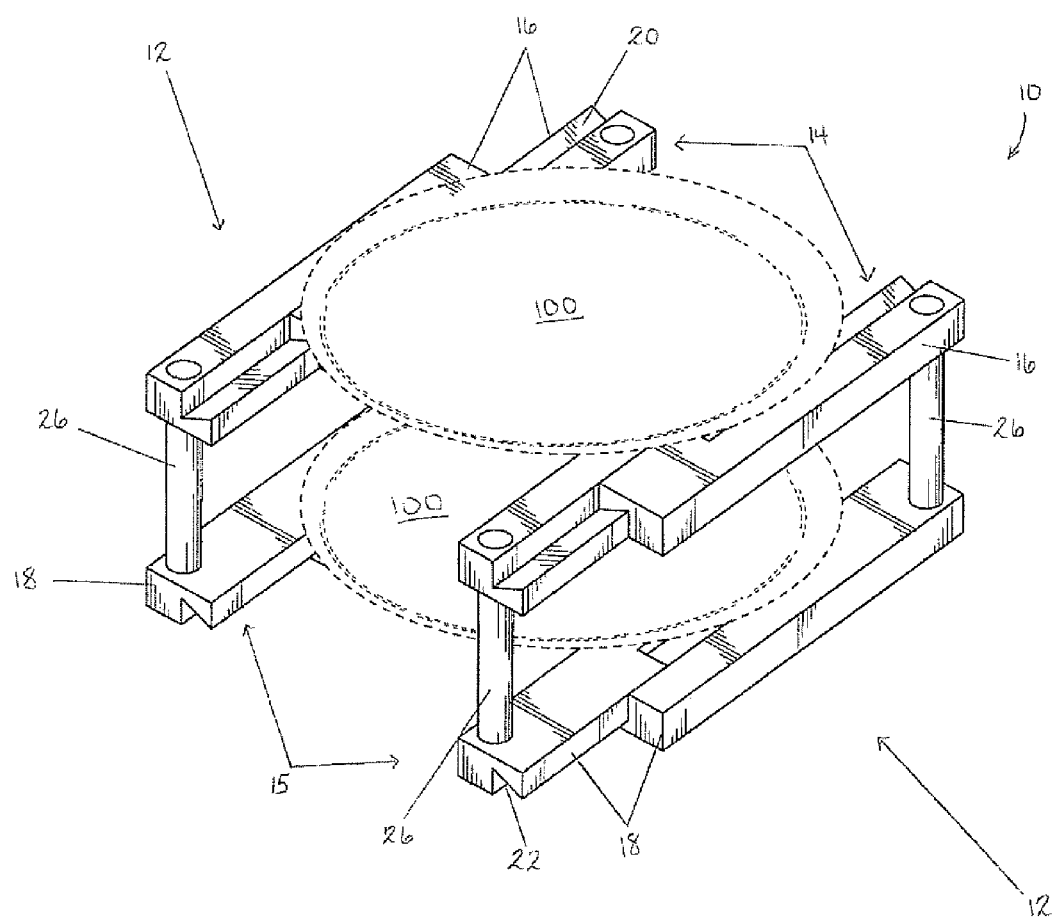
FIG. 1 is an elevated top perspective view of an adjustable rack system in accordance with one or more aspects of the present invention. Two pies are shown stacked on a top rack and a bottom rack of the rack system.

FIGS. 1-6 together show the adjustable rack system 10 of the present invention. The adjustable rack system 10 is adjustable in length as well as in width. In one embodiment, as shown in the drawings, the adjustable rack system 10 may be used to vertically stack and display or store pies 100. However, it should be clearly understood the adjustable rack system 10 may be used to stack and display/store other food items as well as non-food items. The adjustable rack system 10 may be constructed of wood, aluminum, PVC, ABS, steel, injection molded plastic or any other suitable material.

In its simplest form, the adjustable rack system 10 may comprise a pair of support members 12. As shown in the FIG. 1, the two support members 12 are positioned parallel to each other and together provide the rack system 10 with a top rack 14 and a bottom rack 15. A pie 100 is held on top of the top rack 14 and a second pie 100 is held on top of the bottom rack 14. In one embodiment, as shown in FIG. 1, the rack system 10 may have only a top rack 14 and a bottom rack 15. It should be clearly understood, however, that substantial benefit may also be derived from the rack system 10 having one or more additional racks so that more pies 100 may be stacked vertically. Also, according to one embodiment, the rack system 10 may comprise only two support members 12. However, it should be clearly understood that substantial benefit may be derived from a rack system 10 having more than two support members 12. Such an embodiment would be beneficial for stacking and displaying/storing food items (or non-food items) that are wider in shape and/or that may need extra support due to a heavier weight. For example, for a 5 ft. long sheet cake, several support members 12 may be positioned parallel to each other and used to support the ends of the sheet cake pan as well as the middle of the sheet cake pan.

In the embodiment shown in FIG. 1, the support members 12 may not be coupled to each other. This configuration allows for the adjustable rack system 10 to be broken down and packed away easily as very few parts are needed for its construction and function. This configuration also allows for flexibility in how far apart the support members 12 are placed with respect to each other. Specifically, the support members 12 may be positioned close together (e.g. 6 in. apart) to accommodate a pie 100 with a smaller width. Or, the support members 12 may be positioned further apart (e.g. 10 in. apart) to accommodate a pie 100 with a greater width. In another embodiment, a connecting member may be coupled between the two support members 12; this configuration may help to prevent the support members 12 from moving when pies 100 are placed onto or removed from the adjustable rack system 10. It would also prevent the support members 12 from moving if the adjustable rack system 10 is bumped or jostled, thereby preventing the pies 100 from falling off of the adjustable rack system 10. These connecting members may be fixedly coupled to the support members 12. Alternatively, the connecting members may be removably coupled to the support members 12 in order to allow the adjustable rack system 10 to be broken down and packed away easily.

Each support member 12 may have two opposing horizontal top sliding rails 16, two opposing horizontal bottom sliding rails 18, and two vertical support members 26, wherein each vertical support member 26 is used to couple each top sliding rail 16 to a corresponding bottom sliding rail 18. The horizontal top sliding rails 16 may be positioned parallel to the horizontal bottom sliding rails 18. Each pair of opposing sliding rails 16, together, may be rectangular in shape, providing a flat top surface, a flat bottom surface, and two flat side surfaces. According to another embodiment, each pair of opposing sliding rails, together, may be rounded in shape or square. Additionally, each pair of opposing sliding rails 16, together, may be rectangular or square in overall shape and have beveled edges. Together, each pair of opposing sliding rails 16 may form any suitable shape.

Figure 2:
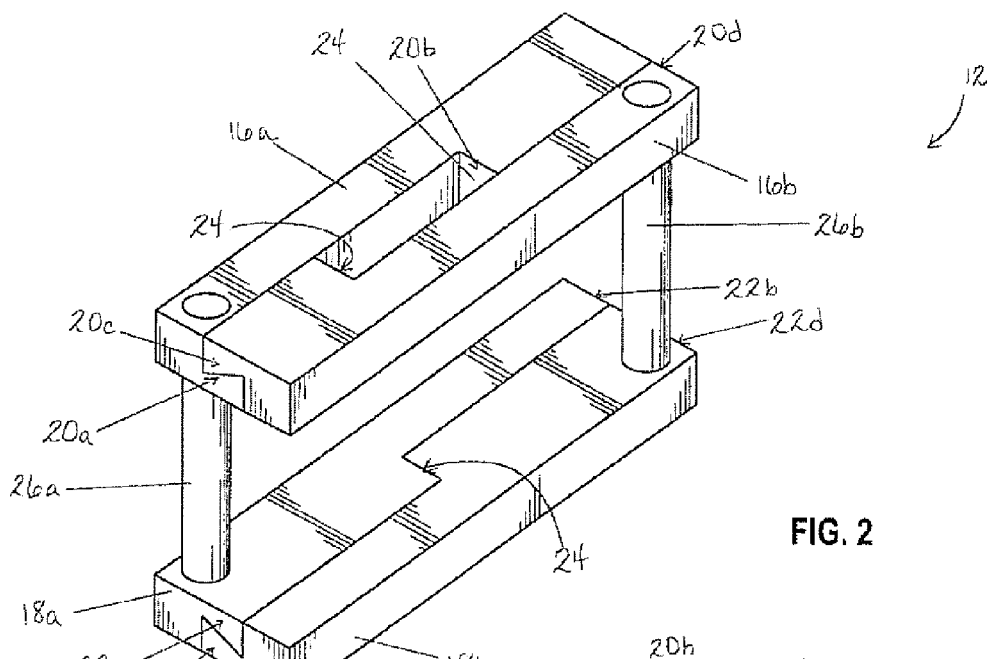
FIG. 2 is an elevated top perspective view of a support member of the adjustable rack system of FIG. 1 shown in a collapsed position.
Figure 3:
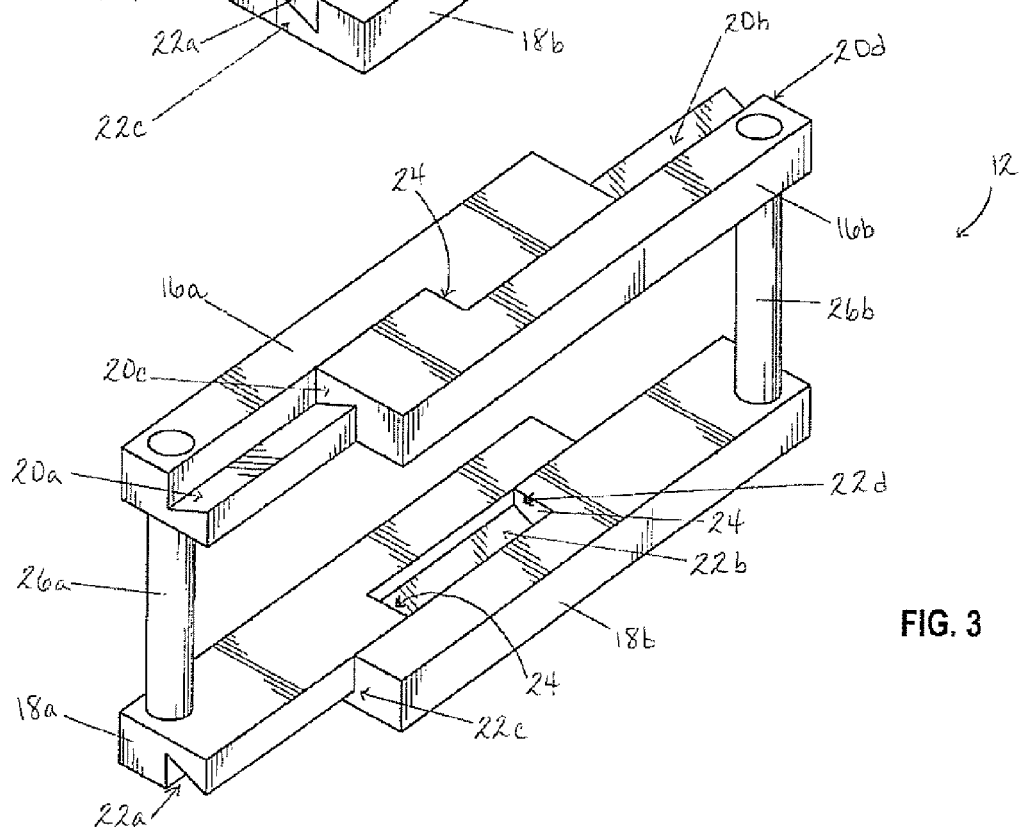
FIG. 3 is an elevated top perspective view of the support member of FIG. 2 shown in an extended position.

Referring to FIGS. 2-3, each support member 12 may have a first top sliding rail 16a (referred to hereinafter as left top sliding rail 16a and referred to generically as top sliding rail 16) and a second top sliding rail 16b (referred to hereinafter as right top sliding rail 16b and referred to generically as top sliding rail 16). And the support member 12 may have a first bottom sliding rail 18a (referred to hereinafter as left bottom sliding rail 18a and referred to generically as bottom sliding rail 18) and a second bottom sliding rail 18b (referred to hereinafter as right bottom sliding rail 18b and referred to generically as bottom sliding rail 18). The left top sliding rail 16a may be coupled to the left bottom sliding rail 18a by a left vertical support 26a (referred to generically as vertical support 26). And the right top sliding rail 16b may be coupled to the right bottom sliding rail 18b by a right vertical support 26b (referred to generically as vertical support 26). As shown in FIGS. 2-3, the left vertical support 26a and the right vertical support 26b may be positioned at opposing ends of the support member 12. In one embodiment, the vertical supports 26 may be cylindrical in shape. However, it should be clearly understood that the vertical supports 26 may have any suitable shape. The vertical supports 26 may be removably coupled to the top sliding rails 16 and the bottom sliding rails 18. Alternatively, the vertical supports 26 may be permanently coupled to or integral with the top sliding rails 16 and the bottom sliding rails 18.

Each of the two opposing top sliding rails 16 may have a pair of half-dovetail grooves 20. Specifically, the left top sliding rail 16a may have a first half-dovetail groove 20a (referred to generically as half-dovetail groove 20) formed along a portion of the length of the left top sliding rail 16a and a second half-dovetail groove 20b (referred to generically as half-dovetail groove 20) formed along another portion of the length of the left top sliding rail 16a. In one embodiment, the first half-dovetail groove 20a may extend along approximately half of the length of the left top sliding rail 16a and the second half-dovetail groove 20b may extend along approximately the remaining half of the length of the left top sliding rail 16a. The right top sliding rail 16b may also have a first half-dovetail groove 20c (referred to generically as half-dovetail groove 20) formed along a portion of the length of the right top sliding rail 16b and a second half-dovetail grove 20d (referred to generically as half-dovetail groove 20) formed along another portion of the length of the right top sliding rail 16b. In one embodiment, the first half-dovetail groove 20c may extend along approximately half of the length of the right top sliding rail 16b and the second half-dovetail groove 20d may extend along approximately the remaining half of the length of the right top sliding rail 16b.

As shown in FIGS. 2-3, the first half-dovetail groove 20a and the second half-dovetail groove 20b of the left top sliding rail 16a may be positioned in opposite directions with respect to each other. For example, the first half-dovetail groove 20a may be facing upwardly and the second half-dovetail groove 20b may be facing downwardly. Correspondingly, the first half-dovetail groove 20c and the second half-dovetail groove 20d of the right top sliding rail 16b may also be positioned in opposite directions with respect to each other. For example, the first half-dovetail groove 20c may be facing downwardly and the second half-dovetail groove 20d may be facing upwardly. In this embodiment, the upwardly facing first half-dovetail groove 20a of the left top sliding rail 16a may slidably engage the downwardly facing first half-dovetail groove 20c of the right top sliding rail 16b. Furthermore, the downwardly facing second half-dovetail groove 20b of the left top sliding rail 16a may slidably engage the upwardly facing second half-dovetail groove 20d of the right top sliding rail 16b. The half-dovetail grooves 20 of the left top sliding rail 16a mate with the half-dovetail grooves 20 of the right top sliding rail 16b so that top sliding rails 16 together create a flat and even top surface and bottom surface of the top support member 12.

Each of the two opposing bottom sliding rails 18 may have a pair of half-dovetail grooves 22. Specifically, the left bottom sliding rail 18a may have a first half-dovetail groove 22a (referred to generically as half-dovetail groove 22) formed along a portion of the length of the left bottom sliding rail 18a and a second half-dovetail groove 22b (referred to generically as half-dovetail groove 22) formed along another portion of the length of the left bottom sliding rail 18a. In one embodiment, the first half-dovetail groove 22a may extend along approximately half of the length of the left bottom sliding rail 18a and the second half-dovetail groove 22b may extend along approximately the remaining half of the length of the left bottom sliding rail 18a. The right bottom sliding rail 18b may also have a first half-dovetail groove 22c (referred to generically as half-dovetail groove 22) formed along a portion of the length of the right bottom sliding rail 18b and a second half-dovetail grove 22d (referred to generically as half-dovetail groove 22) formed along another portion of the length of the right bottom sliding rail 18b. In one embodiment, the first half-dovetail groove 22c may extend along approximately half of the length of the right bottom sliding rail 18b and the second half-dovetail groove 22d may extend along approximately the remaining half of the length of the right bottom sliding rail 18b.

As shown in FIGS. 2-3, the first half-dovetail groove 22a and the second half-dovetail groove 22b of the left bottom sliding rail 18a may be positioned in opposite directions with respect to each other. For example, the first half-dovetail groove 22a may be facing downwardly and the second half-dovetail groove 22b may be facing upwardly. Correspondingly, the first half-dovetail groove 22c and the second half-dovetail groove 22d of the right bottom sliding rail 18b may also be positioned in opposite directions with respect to each other. For example, the first half-dovetail groove 22c may be facing upwardly and the second half-dovetail groove 22d may be facing downwardly. In this embodiment, the downwardly facing first half-dovetail groove 22a of the left bottom sliding rail 18a may slidably engage the upwardly facing first half-dovetail groove 22c of the right bottom sliding rail 18b. Furthermore, the upwardly facing second half-dovetail groove 22b of the left bottom sliding rail 18a may slidably engage the downwardly facing second half-dovetail groove 22d of the right bottom sliding rail 18b. The half-dovetail grooves 22 of the left bottom sliding rail 18a mate with the half-dovetail grooves 22 of the right bottom sliding rail 18b so that bottom sliding rails 18 together create a flat and even top surface and bottom surface of the bottom support member 12.

Figure 6:
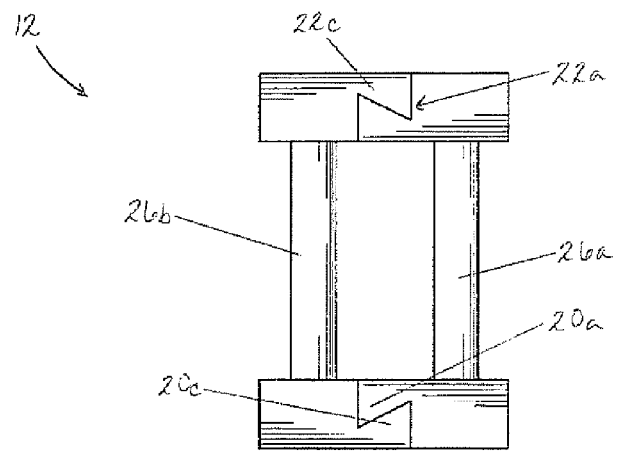
FIG. 6 is a side view of the support member of FIG. 4.

According to one embodiment of the invention, as shown in FIGS. 2-3 and 6, the first half-dovetail groove 20a of the left top sliding rail 16a and the first half-dovetail groove 22a of the left bottom sliding rail 18a may be positioned in opposing directions to each other; similarly, the second half-dovetail groove 20b of the left top sliding rail 16a and the second half-dovetail groove 22b of the left bottom sliding rail 18a may be positioned in opposing directions to each other. For example, the first half-dovetail groove 20a of the left top sliding rail 16a may be facing upwardly and the first half-dovetail groove 22a of the left bottom sliding rail 18a may be facing downwardly. Conversely, the second half-dovetail groove 20b of the left top sliding rail 16a may be facing downwardly and the second half-dovetail groove 22b of the left bottom sliding rail 18a may be facing upwardly.

Furthermore, the first half-dovetail groove 20c of the right top sliding rail 16b and the first half-dovetail groove 22c of the right bottom sliding rail 18b may be positioned in opposing directions to each other; similarly, the second half-dovetail groove 20d of the right top sliding rail 16b and the second half-dovetail groove 22d of the right bottom sliding rail 18b and may be positioned in opposing directions to each other. For example, the first half-dovetail groove 20c of the right top sliding rail 16b may be facing downwardly and the first half-dovetail groove 22c of the right bottom sliding rail 18b may be facing upwardly. Conversely, the second half-dovetail groove 20d of the right top sliding rail 16b may be facing upwardly and the second half-dovetail groove 22d of the right bottom sliding rail 18b may be facing downwardly. This configuration allows the support member 12 to be easily assembled and disassembled by aligning the half-dovetail grooves 20 of the opposing top sliding rails 16 together and aligning the half-dovetail grooves 22 of the opposing bottom sliding rails 18 and snapping them into and out of place.

Figure 5:
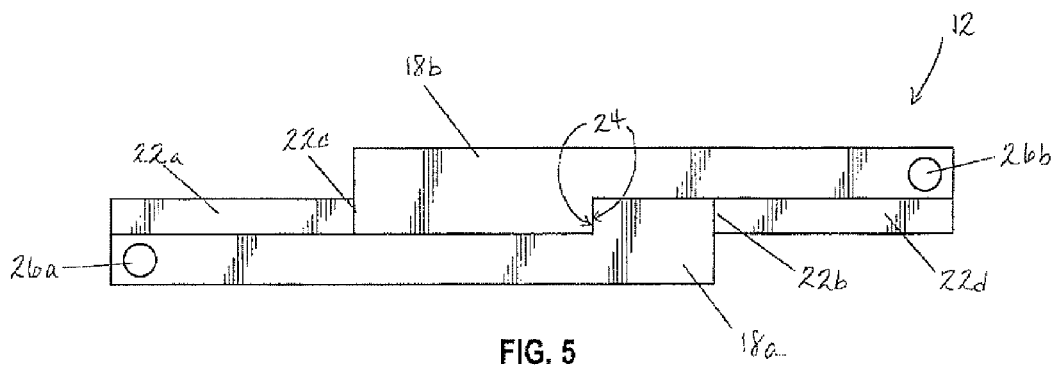
FIG. 5 is a bottom view of the support member of FIG. 3 shown in an extended position.

Referring to the example shown in FIGS. 3 and 5, when the support member 12 is expanded, the half-dovetail grooves 20 of the left top sliding rail 16a engage and slide along the half-dovetail grooves 20 of the right top sliding rail 16b until a side surface 24 of the second half-dovetail groove 20b (shown in the example as downwardly facing) of the left top sliding rail 16a abuts a side surface 24 of the first half-dovetail groove 20c (shown in the example as downwardly facing) of the right top sliding rail 16b and a side surface 24 of the second half-dovetail groove 22b (shown in the example as upwardly facing) of the left bottom sliding rail 18a abuts a side surface 24 of the first half-dovetail groove 22c (shown in the example as upwardly facing) of the right bottom sliding rail 18b. This configuration prevents the top sliding rails 16 and the bottom sliding rails 18 from sliding so far apart that they disengage. The support member 12 may be expanded to various lengths until the sides surfaces 24 contact each other and prevent further expansion. In one embodiment, the support members 12 may expand and contract smoothly and continuously. In another embodiment, the support member 12 may have notches, ball bearings, or some other ratchet-type feature to allow the support members 12 to lock firmly into place at incremental lengths during expansion or contraction.

Figure 4:
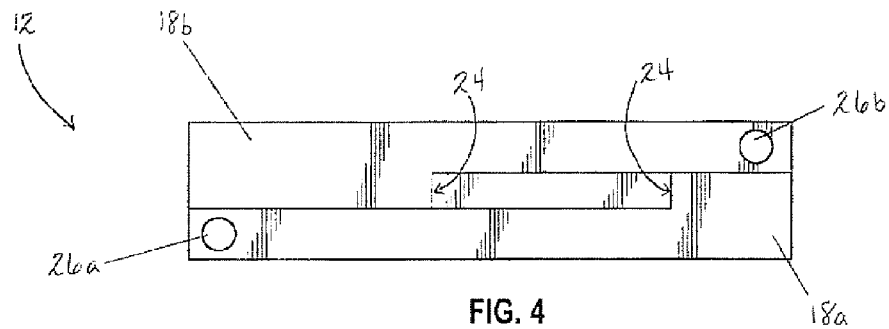
FIG. 4 is a bottom view of the support member of FIG. 2 shown in a collapsed position.

Referring to FIGS. 2 and 4, when the support member 12 is contracted, the half-dovetail grooves 20 of the left top sliding rail 16a engage and slide along the half-dovetail grooves 20 of the right top sliding rail 16b until a side surface 24 of the first half-dovetail groove 20a (shown in the example as upwardly facing) of the left top sliding rail 16a abuts a side surface 24 of the second half-dovetail groove 20d (shown in the example as upwardly facing) of the right top sliding rail 16b and a side surface 24 of the first half-dovetail groove 22a (shown in the example as downwardly facing) of the left bottom sliding rail 18a abuts a side surface 24 of the second half-dovetail groove 22d (shown in the example as downwardly facing) of the right bottom sliding rail 18b. This configuration allows the support member 12 to collapse and prevents the support member 12 from expanding in the opposite direction.

The foregoing description is provided to enable any person skilled in the relevant art to practice the various embodiments described herein. Various modifications to these embodiments will be readily apparent to those skilled in the relevant art, and generic principles defined herein can be applied to other embodiments. Thus, the claims are not intended to be limited to the embodiments shown and described herein, but are to be accorded the full scope consistent with the language of the claims, wherein reference to an element in the singular is not intended to mean "one and only one" unless specifically stated, but rather "one or more." All structural and functional equivalents to the elements of the various embodiments described throughout this disclosure that are known or later come to be known to those of ordinary skill in the relevant art are expressly incorporated herein by reference and intended to be encompassed by the claims. Moreover, nothing disclosed herein is intended to be dedicated to the public.

What is claimed is:

1. An adjustable rack system comprising:
   at least two support members, the at least two support members being detached from each other and adjustable in length, wherein each support member comprises:
   a first top sliding rail having two grooves oriented in an opposite direction from one another, each groove formed along a portion of a length of the first top sliding rail;
   a second top sliding rail having two grooves oriented in an opposite direction from one another, each groove formed along a portion of a length of the second top sliding rail;
   a first bottom sliding rail having two grooves oriented in an opposite direction from one another, each groove formed along a portion of a length of the first bottom sliding rail; and
   a second bottom sliding rail having two grooves oriented in an opposite direction from one another, each groove formed along a portion of a length of the second bottom sliding rail;
   wherein the two grooves of the first top sliding rail mate with and slidably engage the two grooves of the second top sliding rail;
   wherein the two grooves of the first bottom sliding rail mate with and slidably engage the two grooves of the second bottom sliding rail; and
   a pair of vertical supports, each vertical support coupling a top sliding rail to a corresponding bottom sliding rail;
   wherein the vertical supports are coupled at opposing ends of the support member.

2. The adjustable rack system of claim 1, wherein the grooves of the first top sliding rail are positioned in an opposite direction as the corresponding grooves of the first bottom sliding rail and wherein the grooves of the second top sliding rail are positioned in an opposite direction as the corresponding grooves of the second bottom sliding rail.

3. The adjustable rack system of claim 1, wherein the two grooves of the first top sliding rail comprises:
   an upwardly facing groove that extends along a first half of the length of the first top sliding rail;
   a downwardly facing groove that extends along a remaining half of the length of the first top sliding rail; and
   wherein the two grooves of the second top sliding rail comprises:
   a downwardly facing groove that extends along a first half of the length of the second top sliding rail; and
   an upwardly facing groove that extends along a remaining half of the length of the second top sliding rail.

4. The adjustable rack system of the claim 3 wherein the upwardly facing groove of the first top sliding rail mates with the downwardly facing groove of the second top sliding rail and wherein the downwardly facing groove of the first top sliding rail mates with the upwardly facing groove of the second top sliding rail.

5. The adjustable rack system of claim 3 wherein the support member may be expanded lengthwise until a side surface of the downwardly facing groove of the first top sliding rail abuts a side surface of the downwardly facing groove of the second top sliding rail and wherein the support member may be contracted lengthwise until a side surface of the upwardly facing groove of the first top sliding rail abuts a side surface of the upwardly facing groove of the second top sliding rail.

6. The adjustable rack system of claim 1, wherein the two grooves of the first bottom sliding rail comprises:
   a downwardly facing groove that extends along a first half of the length of the first bottom sliding rail;
   an upwardly facing groove that extends along a remaining half of the length of the first bottom sliding rail; and
   wherein the two grooves of the second bottom sliding rail comprises:
   an upwardly facing groove that extends along a first half of the length of the second bottom sliding rail; and
   a downwardly facing groove that extends along a remaining half of the length of the second bottom sliding rail.

7. The adjustable rack system of the claim 6 wherein the downwardly facing groove of the first bottom sliding rail mates with the upwardly facing groove of the second bottom sliding rail and wherein the upwardly facing groove of the first bottom sliding rail mates with the downwardly facing groove of the second bottom sliding rail.

8. The adjustable rack system of claim 6 wherein the support member may be expanded lengthwise until a side surface of the upwardly facing groove of the first bottom sliding rail abuts a side surface of the upwardly facing groove of the second bottom sliding rail and wherein the support member may be contracted lengthwise until a side surface of the downwardly facing groove of the first bottom sliding rail abuts a side surface of the downwardly facing groove of the second bottom sliding rail.

9. An adjustable rack system comprising:
   at least two support members, the at least two support members being detached from each other and adjustable in length, wherein when the at least two support members are positioned approximately parallel to one another a top surface area of each of the at least two support members forming a top rack area and a bottom area of each of the at least two support members forming a bottom rack area, wherein each support member comprises:
   a pair of opposing top sliding rails, the pair of opposing top sliding rails comprising:
   a first top sliding rail having two grooves oriented in an opposite direction from one another, each groove formed along a portion of a length of the first top sliding rail;
   a second top sliding rail having two grooves oriented in an opposite direction from one another, each groove formed along a portion of a length of the second top sliding rail;
   a pair of opposing bottom sliding rails, the pair of opposing bottom sliding rails comprising:
   a first bottom sliding rail having two grooves oriented in an opposite direction from one another, each groove formed along a portion of a length of the first bottom sliding rail; and
   a second bottom sliding rail having two grooves oriented in an opposite direction from one another, each groove formed along a portion of a length of the second bottom sliding rail;
   wherein the two grooves of the first top sliding rail mate with and slidably engage the two grooves of the second top sliding rail;
   wherein the two grooves of the first bottom sliding rail mate with and slidably engage the two grooves of the second bottom sliding rail; and
   a pair of vertical supports, each vertical support coupling a top sliding rail to a corresponding bottom sliding rail;

wherein the vertical supports are coupled at opposing ends of the support member.

* * * * *